United States Patent
Mickelson et al.

(10) Patent No.: US 11,358,733 B2
(45) Date of Patent: Jun. 14, 2022

(54) OPTIMUM IDLE DESCENT START POINT DISPLAY BASED ON CURRENT CONDITIONS

(71) Applicant: Rockwell Collins, Inc., Cedar Rapids, IA (US)

(72) Inventors: Bradley R. Mickelson, Cedar Rapids, IA (US); Mark W. Volner, Marion, IA (US); Dinesh Kumar Kushwaha, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 168 days.

(21) Appl. No.: 16/816,665

(22) Filed: Mar. 12, 2020

(65) Prior Publication Data
US 2021/0221529 A1  Jul. 22, 2021

(51) Int. Cl.
B64D 43/00 (2006.01)
G08G 5/00 (2006.01)

(52) U.S. Cl.
CPC ........... *B64D 43/00* (2013.01); *G08G 5/0021* (2013.01)

(58) Field of Classification Search
CPC .... B64D 43/00; G08G 5/0021; G08G 5/0091; G08G 5/025
USPC ........................................ 340/963, 971, 945
See application file for complete search history.

(56) References Cited

U.S. PATENT DOCUMENTS

| | | | |
|---|---|---|---|
| 3,665,465 A | 5/1972 | Miller | |
| 3,916,688 A | 11/1975 | Dendy et al. | |
| 4,232,839 A | 11/1980 | Sicre et al. | |
| 4,633,404 A | 12/1986 | Greeson et al. | |
| 4,709,336 A | 11/1987 | Zweifel | |
| 4,825,374 A | 4/1989 | King et al. | |
| 5,142,478 A | 8/1992 | Crook | |
| 7,330,781 B2 | 2/2008 | Artini et al. | |
| 8,346,412 B2 | 1/2013 | Lacaze et al. | |
| 8,352,104 B2 | 1/2013 | Wachenheim et al. | |
| 8,447,442 B2 | 5/2013 | Sacle et al. | |

(Continued)

FOREIGN PATENT DOCUMENTS

CN  105843232 A  8/2016
FR  2334942 A1  7/1977

(Continued)

OTHER PUBLICATIONS

Extended Search Report for European Application No. 21152529.0 dated Apr. 12, 2021, 8 pages.

(Continued)

*Primary Examiner* — Eric Blount
(74) *Attorney, Agent, or Firm* — Suiter Swantz pc llo (57) ABSTRACT

A system and method for computing and displaying a fuel optimal idle deceleration start point which minimizes the overall auto throttle movement keeping the throttle at idle detent throughout the maneuver thus minimizing the fuel burn and stress on engine. The need for speed brakes deployment is also reduced because the deceleration distance length is accordingly adjusted based on current parameters. The accurate solution takes into account the current condition such as aircraft weight, altitude and speed and environmental parameters such as wind and temperature. The computed deceleration start point is displayed on map/navigation and vertical display for enhanced flight crew awareness.

15 Claims, 5 Drawing Sheets

(56) References Cited

U.S. PATENT DOCUMENTS

| | | | |
|---|---|---|---|
| 9,815,571 | B1 | 11/2017 | Ogden et al. |
| 2006/0265110 | A1 | 11/2006 | Ferro et al. |
| 2010/0318244 | A1* | 12/2010 | Gomez ................ G08G 5/0082 701/3 |
| 2015/0151849 | A1 | 6/2015 | Labastie et al. |
| 2017/0243495 | A1 | 8/2017 | Moravek et al. |

FOREIGN PATENT DOCUMENTS

| | | |
|---|---|---|
| FR | 2344001 A2 | 10/1977 |
| FR | 3014214 B1 | 4/2017 |

OTHER PUBLICATIONS

Office Action in European Application No. 21152529.0 dated Mar. 11, 2022.

\* cited by examiner

OPTIMUM IDLE DESCENT START POINT DISPLAY BASED ON CURRENT CONDITIONS

CROSS-REFERENCE TO RELATED APPLICATIONS

The present application claims priority to India Provisional Patent Application No. 202011002658, filed Jan. 21, 2020, entitled OPTIMUM DECLERATION START POINT DISPLAY BASED ON CURRENT CONDITIONS, and naming Bradley R. Mickelson, Mark W. Volner, and Dinesh Kumar Kushwaha as inventors, which is incorporated herein by reference in its entirety.

BACKGROUND

Current flight management systems (FMS) may attempt to predict a point at which the pilot must begin a deceleration and subsequent descent to arrive at a published or statutory approach constraint. This prediction may be inaccurate based on stale information used as a basis for the prediction. Winds may have changed, temperature may be different from forecast, and air traffic control may have rerouted an aircraft off a scheduled path for arrival.

Many variables may determine an accurate point to reduce throttles to idle and still comply with a plurality of approach constraints. Current FMS may use a standard assumed rate of 5 kts/100 ft of range to decelerate. Many aircraft do not fit this standard profile considering a heavy at slower cruise speed versus a light aircraft at higher cruise speed.

An idle power descent may be valuable to an operator considering fuel burned and engine stress. Each movement of the throttles above idle during the descent or a delayed top of descent from cruise based on stale forecast environmental conditions may cause increased fuel burn. In addition, an idle power descent may be advantageous to reduce aircraft noise reducing time of higher thrust to maintain an assigned speed after an early descent. Passenger comfort may increase with a constant idle, constant deceleration, descent from the initial point when throttles are reduced to idle at cruise altitude to a mandatory stabilized approach point.

Therefore, a need remains for a system and related method which may overcome these limitations and provide a novel solution to determining and display of an optimum point at which to reduce throttles to idle for descent based on continuously updated plurality of factors.

SUMMARY

In one aspect, embodiments of the inventive concepts disclosed herein are directed to a system for display of idle thrust deceleration start point, comprising: a pilot display available to a pilot of an aircraft and a flight controller configured for determining a position and a trajectory of the aircraft.

The system may include a parameter input operatively coupled with the flight controller, the parameter input configured for receiving a state parameter and an environmental variable and supplying each to the flight controller, the state parameter defining a speed of the aircraft, an altitude of the aircraft, and a weight of the aircraft and a tangible, non-transitory memory configured to communicate with the flight controller, the tangible, non-transitory memory having instructions stored therein that, in response to execution by the flight controller, cause the flight controller to carry out the steps of the system.

The flight controller may receive, from the parameter input, a continuously updated state parameter and a continuously updated environmental variable and receive a performance parameter of the aircraft including a clean rate of deceleration at idle thrust, a clean descent speed at idle thrust, and a clean rate of descent at idle thrust.

The flight controller may also receive, from the pilot, a constraint associated with a descent including a desired descent speed, a speed constraint associated with a speed waypoint, and an altitude constraint associated with an altitude waypoint and generate an idle thrust deceleration start point based on each of the position, the trajectory, the continuously updated state parameter, the continuously updated environmental variable, the performance parameter, and the constraint. The flight controller may further display the generated idle thrust deceleration start point to the pilot on the pilot display.

A further embodiment of the inventive concepts disclosed herein may include a method for display of idle thrust deceleration start point. The method may comprise receiving a continuously updated state parameter, the state parameter defining a position of an aircraft, a trajectory of the aircraft, a speed of the aircraft, an altitude of the aircraft, and a weight of the aircraft and receiving a continuously updated environmental variable.

The method may further include receiving a performance parameter of the aircraft including a clean rate of deceleration at idle thrust, a clean descent speed at idle thrust, and a clean rate of descent at idle thrust and receiving a constraint associated with a descent including a desired descent speed, a speed constraint associated with a speed waypoint, and an altitude constraint associated with an altitude waypoint.

The method may further include generating an idle thrust deceleration start point based on each of the position, the trajectory, the continuously updated state parameter, the continuously updated environmental variable, the performance parameter, and the constraint and displaying the generated deceleration start point to a pilot on a pilot display.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method for computing and displaying a fuel optimal idle deceleration start point which minimizes the overall auto throttle movement keeping the throttle at idle detent throughout the maneuver thus minimizing the fuel burn and stress on engine. The need for speed brakes deployment is also reduced because the deceleration distance length is accordingly adjusted based on current parameters. The accurate solution takes into account the current condition such as aircraft weight, altitude and speed and environmental parameters such as wind and temperature. The computed deceleration start point is displayed on map/navigation and vertical display for enhanced flight crew awareness

| REFERENCE CHART | |
|---|---|
| 100 | System for Idle Descent |
| 200 | Descent Diagram On Path |
| 300 | Descent Diagram Off Path |
| 400 | Display Diagram |
| 500 | Method Flow |
| 150 | State Parameter |
| 140 | Performance Parameter |
| 116 | Parameter Update |
| 160 | Environmental Variable |
| 114 | Parameter Input |
| 112 | Memory |
| 110 | Flight Controller |
| 130 | Constraint |
| 132 | Pilot Interface |
| 120 | Display |
| 122 | Idle Descent Start Point |
| 222 | Idle Thrust point On/Fast |
| 202 | Level Segment |
| 204 | Constant Speed Descent Segment |
| 206 | Decelerating Descent Segment |
| 208 | Constraint Speed Descent Segment |
| 210 | Horizontal Path On/On |
| 212 | Vertical Path On/On |
| 322 | Idle Thrust Point Low/Fast |
| 332 | Idle Thrust Point High/SLow |
| 424 | Aircraft Indicator |
| 422 | Idle Start Point Caret |
| 502 | Receive State Parameter |
| 504 | Receive Environmental Variable |
| 506 | Receive Performance Parameter |
| 508 | Receive Constraint |
| 510 | Generate Start Point |
| 512 | Display Start Point |

FIG. 1

Figure 1:
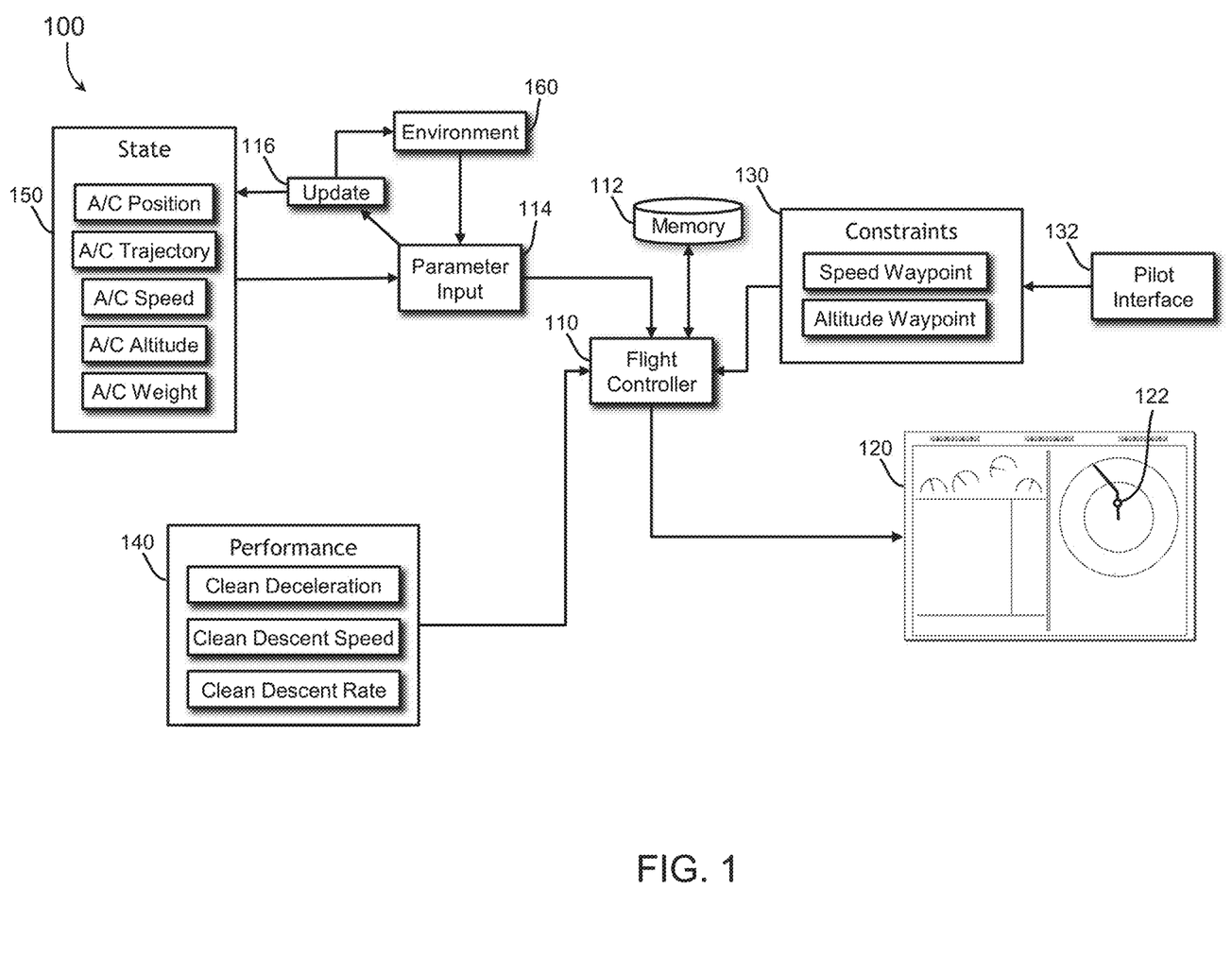
FIG. 1 is a diagram of a system for display of idle thrust deceleration start point in accordance with an embodiment of the inventive concepts disclosed herein.

Referring now to FIG. 1, a diagram of a system for display of idle thrust deceleration start point in accordance with an embodiment of the inventive concepts disclosed herein is shown. Generally, a system for display of idle thrust deceleration start point 100 may include a a pilot display 120 available to a pilot of an aircraft and a a flight controller 110 configured for determining a position and a trajectory of the aircraft. A a parameter input 114 and associated parameter update 116 may be operatively coupled with the flight controller 110 to enable the parameter input to receive a state parameter 150 and an environmental variable 160 and supply each to the flight controller 110. The state parameter 150 may define a position, a trajectory, a speed, an altitude, and a weight of the aircraft.

In one embodiment of the inventive concepts disclosed herein, the for data retention and instructions, a tangible, non-transitory memory 112 may be configured to communicate with the flight controller 110, the tangible, non-transitory memory 112 may have instructions stored therein that, in response to execution by the flight controller 110, cause the flight controller 110 to carry out a plurality of functions of the system for display of idle thrust deceleration start point 100.

In function, the flight controller 110 may receive, from the parameter input 114, a continuously updated version of the state parameter and a continuously updated version of the environmental variable. For example, the aircraft weight may change (lighter or heavier depending on aerial refueling) and the environmental variable may change based on weather conditions prior to and during the descent.

In one embodiment of the inventive concepts disclosed herein, the flight controller 110 may also receive a performance parameter 140 of the aircraft including a clean rate of deceleration at idle thrust, a clean descent speed at idle thrust, and a clean rate of descent at idle thrust. As used herein, the term clean may refer to an aircraft state wherein no drag devices (e.g., speed brakes, spoilers), lift devices (e.g., flaps), or landing gear may be deployed. In theory, the performance parameters may not change much during a time prior to the descent and during the descent. However, the flight controller 110 may query one or more aircraft systems including the aircraft state 150 to determine an updated performance parameter.

In one embodiment of the inventive concepts disclosed herein, the flight controller 110 may also receive, from the pilot via a pilot interface 132, a constraint 130 associated with a descent including a desired descent speed, a speed constraint associated with a speed waypoint, and an altitude constraint associated with an altitude waypoint. A constraint may define one or more statutory or published restrictions to speed and altitude at a specific point on the descent. For example, one statutory constraint may include a restriction to a maximum speed of 250 knots (kts) at or below 10,000 feet above mean sea level (MSL). One published example of a restriction may include a published speed of 280 kts at 14,000 ft MSL at a specific waypoint. A speed waypoint may include a speed restriction at a specific waypoint while an altitude waypoint may include an altitude restriction at a specific waypoint. Here, a speed may include an exact number (e.g., 280 kts) or a range (280-300 kts). Similarly, an altitude waypoint may include a fixed number (cross ANOSA at 15,000 ft), an at or below number (cross ANOSA at or below 12,000 ft) or a range (cross ANOSA between 12,000-15,000 ft).

Once the updated parameters are received, the flight controller 110 may generate an idle thrust deceleration start point 122 based on each of the position, the trajectory, the continuously updated at least one state parameter, the continuously updated at least one environmental variable, the at least one performance parameter, and the at least one constraint and display the generated idle thrust deceleration start point to the pilot on the pilot display 120.

FIG. 2

Figure 2:
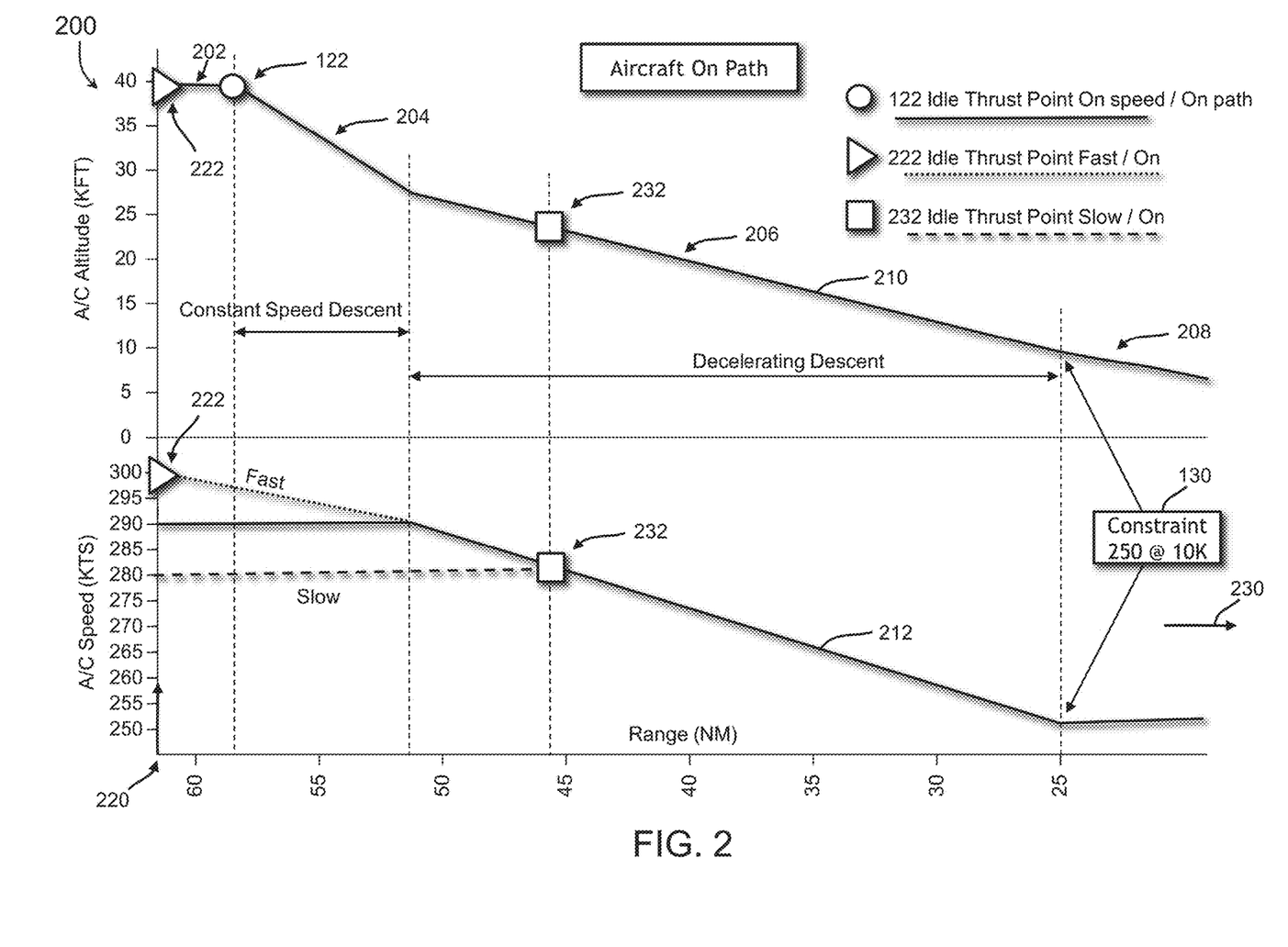
FIG. 2 is a diagram of an exemplary on vertical path scenario with an aircraft fast or slow in accordance with an embodiment of the inventive concepts disclosed herein.

Referring now to FIG. 2, a diagram of an exemplary on vertical path scenario with an aircraft fast or slow in accordance with an embodiment of the inventive concepts disclosed herein is shown.

FIG. 3

Figure 3:
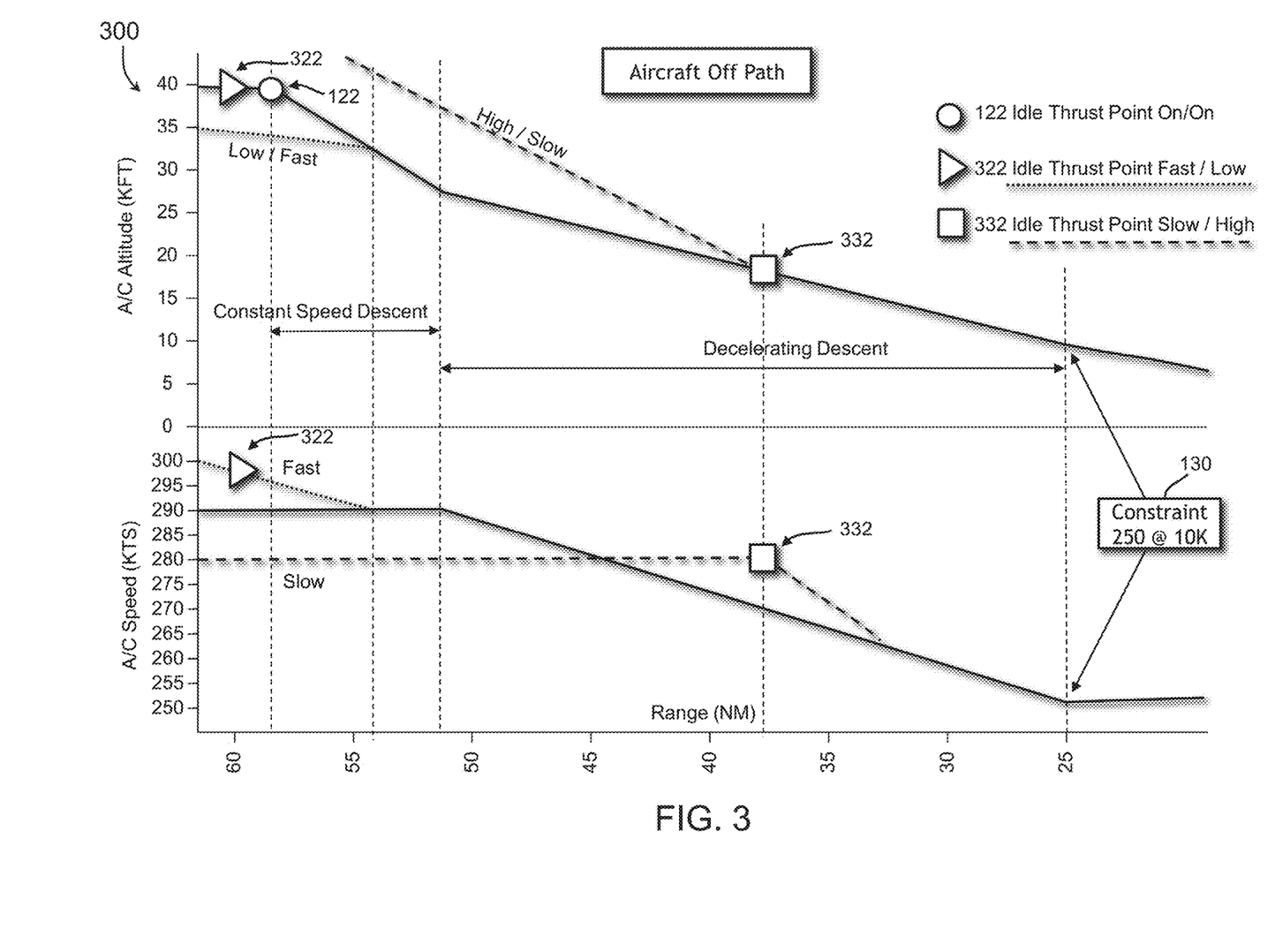
FIG. 3 is a diagram of an exemplary off vertical path scenario with an aircraft fast or slow in accordance with an embodiment of the inventive concepts disclosed herein.

Referring now to FIG. 3, a diagram of an exemplary off vertical path scenario with an aircraft fast or slow in accordance with an embodiment of the inventive concepts disclosed herein is shown.

FIG. 4

Figure 4:
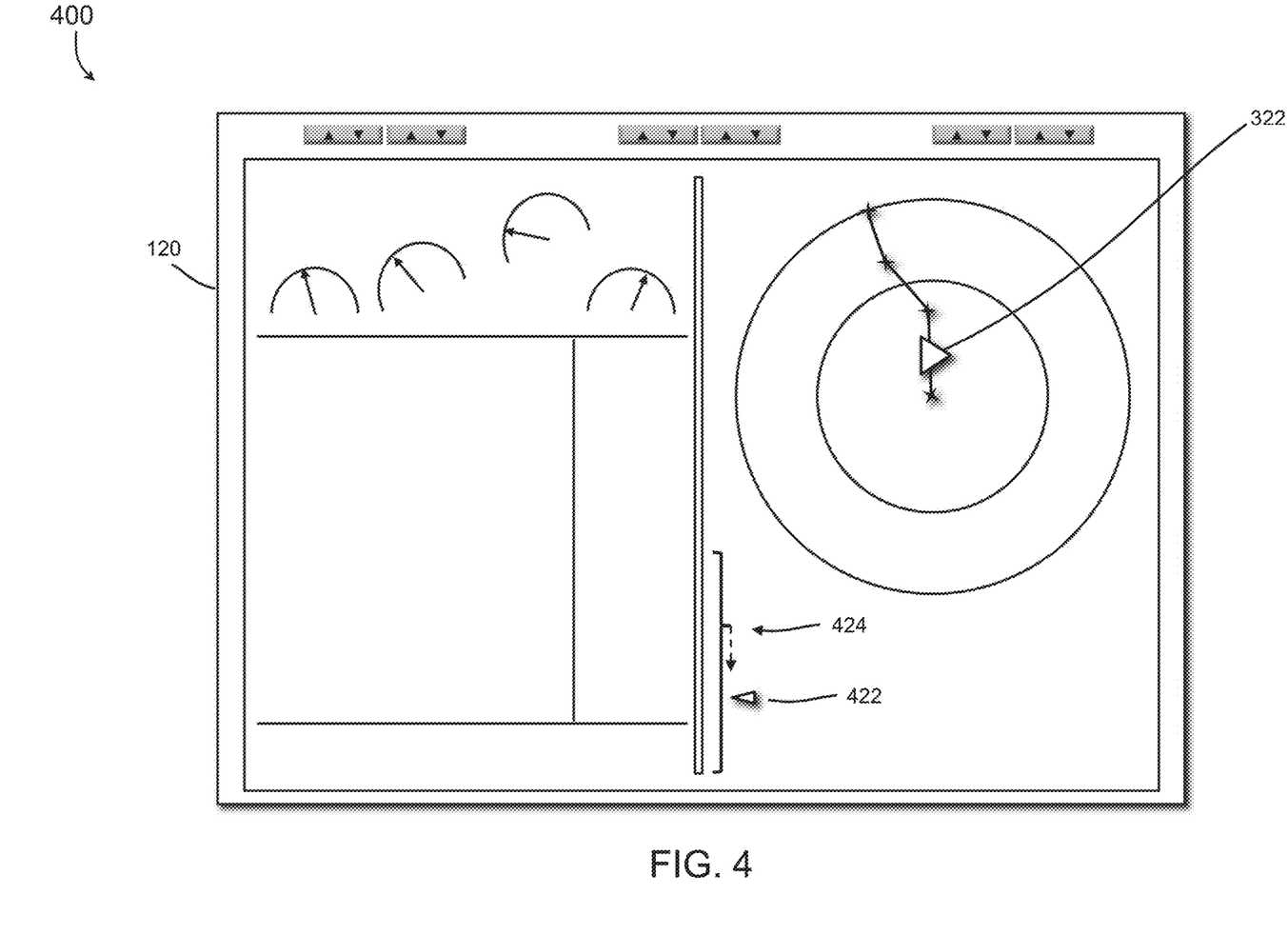
FIG. 4 is a diagram of a flight deck display exemplary of one embodiment of the inventive concepts disclosed herein.

Referring now to FIG. 4, a diagram of a flight deck display exemplary of one embodiment of the inventive concepts disclosed herein is shown.

FIG. 5

Figure 5:
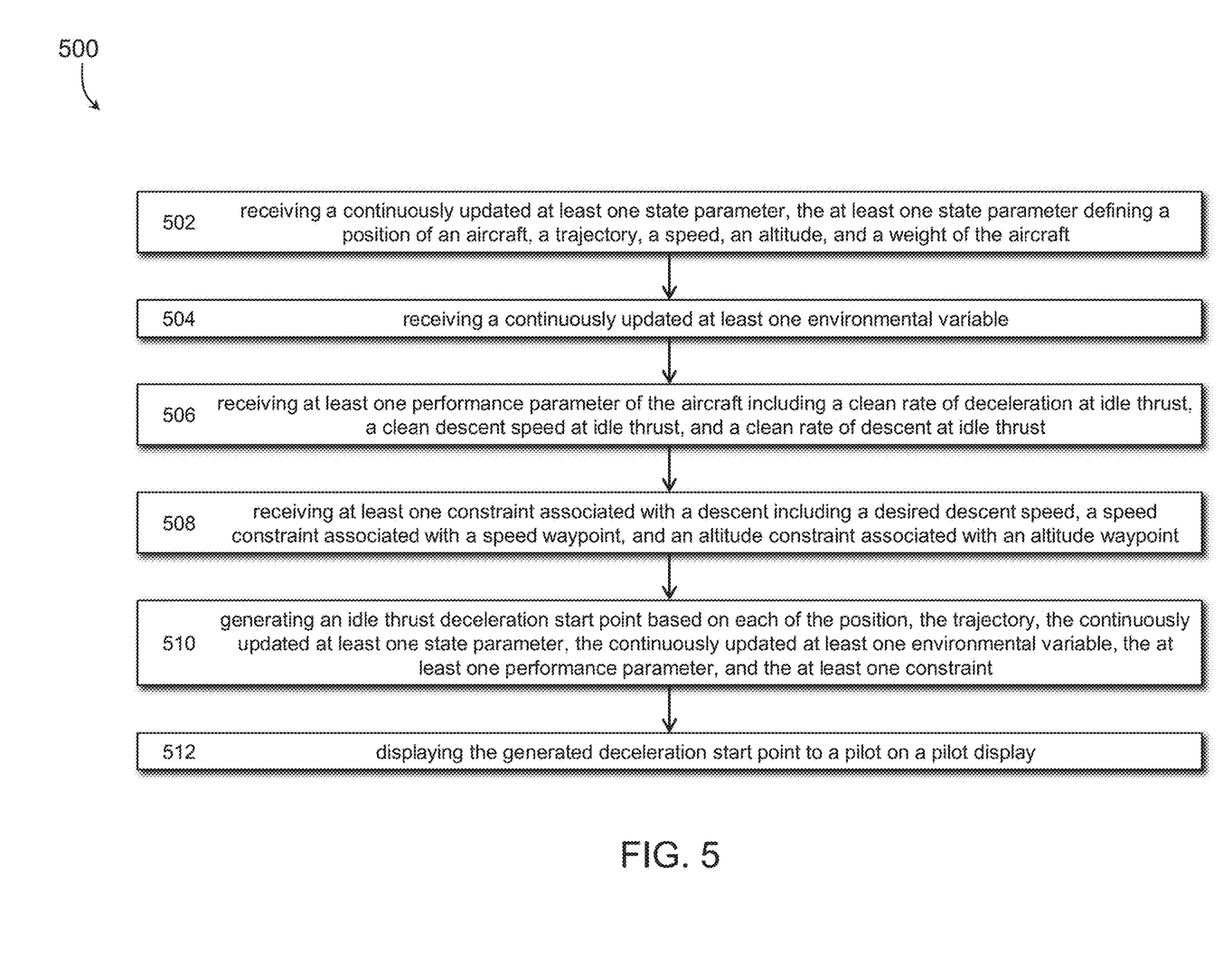
FIG. 5 is a diagram of a method flow in accordance with one embodiment of the inventive concepts disclosed herein.

Referring now to FIG. 5, a diagram of a method flow in accordance with one embodiment of the inventive concepts disclosed herein is shown.

A step 502 may include receiving a continuously updated at least one state parameter, the at least one state parameter defining a position of an aircraft, a trajectory of the aircraft, a speed of the aircraft, an altitude of the aircraft, and a weight of the aircraft.

A step 504 may include receiving a continuously updated at least one environmental variable and a step 506 may include receiving at least one performance parameter of the aircraft including a clean rate of deceleration at idle thrust, a clean descent speed at idle thrust, and a clean rate of descent at idle thrust.

A step 508 may include receiving at least one constraint associated with a descent including a desired descent speed, a speed constraint associated with a speed waypoint, and an altitude constraint associated with an altitude waypoint.

A step 510 may include generating an idle thrust deceleration start point based on each of the position, the trajectory, the continuously updated at least one state parameter, the continuously updated at least one environmental variable, the at least one performance parameter, and the at least one constraint, and a step 512 may include displaying the generated deceleration start point to a pilot on a pilot display.

CONCLUSION

As will be appreciated from the above description, embodiments of the inventive concepts disclosed herein may provide a novel solution to determining and display of an optimum point at which to reduce throttles to idle for descent based on continuously updated plurality of factors.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for display of idle thrust deceleration start point, comprising:
a pilot display available to a pilot of an aircraft;
a flight controller configured for determining a position and a trajectory of the aircraft;
a parameter input operatively coupled with the flight controller, the parameter input configured for receiving at least one state parameter and at least one environmental variable and supplying each to the flight controller, the at least one state parameter defining a speed of the aircraft, an altitude of the aircraft, and a weight of the aircraft;
a tangible, non-transitory memory configured to communicate with the flight controller, the tangible, non-transitory memory having instructions stored therein that, in response to execution by the flight controller, cause the flight controller to:
receive, from the parameter input, a continuously updated at least one state parameter and a continuously updated at least one environmental variable;
receive at least one performance parameter of the aircraft including a clean rate of deceleration at idle thrust, a clean descent speed at idle thrust, and a clean rate of descent at idle thrust;
receive, from the pilot, at least one constraint associated with a descent including a desired descent speed, a speed constraint associated with a speed waypoint, and an altitude constraint associated with an altitude waypoint;
generate an idle thrust deceleration start point based on each of the position, the trajectory, the continuously updated at least one state parameter, the continuously updated at least one environmental variable, the at least one performance parameter, and the at least one constraint; and
display the generated idle thrust deceleration start point to the pilot on the pilot display.

2. The system for display of idle thrust deceleration start point of claim 1, wherein the parameter input further comprises one of: a data link and an internal aircraft information transfer bus.

3. The system for display of idle thrust deceleration start point of claim 1, wherein pilot display further comprises a forward panel display and a head mounted display.

4. The system for display of idle thrust deceleration start point of claim 1, wherein each of the at least one performance parameter is further continuously updated based on the updated at least one state parameter.

5. The system for display of idle thrust deceleration start point of claim 1, wherein flight controller further comprises one of: a mission computer (MC), a flight control computer (FCC), a flight management system (FMS), and an autopilot system.

6. The system for display of idle thrust deceleration start point of claim 1, wherein the generated idle thrust deceleration start point further comprises a clean descent at idle thrust from the idle thrust deceleration start point to the at least one constraint.

7. The system for display of idle thrust deceleration start point of claim 1, wherein the generated idle thrust deceleration start point further comprises a plurality of idle thrust deceleration start points enabling compliance with an associated plurality of the at least one constraint.

8. The system for display of idle thrust deceleration start point of claim 1, wherein the position and trajectory are determined aided by one of an inertial system and a global navigation satellite system.

9. The system for display of idle thrust deceleration start point of claim 1, wherein the at least one environmental variable further includes a current wind speed and direction for at least one altitude, a current temperature for at least one altitude, and a current barometric pressure for at least one altitude.

10. The system for display of idle thrust deceleration start point of claim 1, wherein the at least one performance parameter of the aircraft is based on one of: a type of aircraft, a drag index of the aircraft, and an amount of idle thrust of the aircraft.

11. A method for display of idle thrust deceleration start point, comprising:
receiving a continuously updated at least one state parameter, the at least one state parameter defining a position of an aircraft, a trajectory of the aircraft, a speed of the aircraft, an altitude of the aircraft, and a weight of the aircraft;
receiving a continuously updated at least one environmental variable;
receiving at least one performance parameter of the aircraft including a clean rate of deceleration at idle thrust, a clean descent speed at idle thrust, and a clean rate of descent at idle thrust;
receiving at least one constraint associated with a descent including a desired descent speed, a speed constraint associated with a speed waypoint, and an altitude constraint associated with an altitude waypoint;
generating an idle thrust deceleration start point based on each of the position, the trajectory, the continuously updated at least one state parameter, the continuously updated at least one environmental variable, the at least one performance parameter, and the at least one constraint; and
displaying the generated deceleration start point to a pilot on a pilot display.

12. The method for display of idle thrust deceleration start point of claim 11, wherein receiving a continuously updated at least one environmental variable further comprises receiving a current wind speed and direction for at least one altitude, a current temperature for at least one altitude, and a current barometric pressure for at least one altitude.

13. The method for display of idle thrust deceleration start point of claim 11, wherein receiving at least one performance parameter of the aircraft further comprises updating the at least one performance parameter based on an updated at least one state parameter.

14. The method for display of idle thrust deceleration start point of claim 11, wherein generating an idle thrust deceleration start point further comprises generating a clean descent at idle thrust from the idle thrust deceleration start point to the at least one constraint.

15. The method for display of idle thrust deceleration start point of claim 11, wherein generating an idle thrust deceleration start point further comprises generating a plurality of idle thrust deceleration start points enabling compliance with an associated plurality of the at least one constraint.

* * * * *